(12) United States Patent
Wang et al.

(10) Patent No.: US 9,218,208 B2
(45) Date of Patent: Dec. 22, 2015

(54) METHOD AND SYSTEM OF TRAFFIC PROCESSOR SELECTION FOR BROADCAST/MULTICAST SERVICE IN A WIRELESS NETWORK

(75) Inventors: Liwa Wang, Morris Plains, NJ (US); Pengfei Zhu, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2039 days.

(21) Appl. No.: 12/287,675

(22) Filed: Oct. 10, 2008

(65) Prior Publication Data
US 2010/0091694 A1 Apr. 15, 2010

(51) Int. Cl.
*H04M 1/00* (2006.01)
*G06F 9/50* (2006.01)

(52) U.S. Cl.
CPC .................... *G06F 9/5027* (2013.01)

(58) Field of Classification Search
CPC ... G06F 9/5027; G06F 1/1624; G06F 9/4401; G06F 27/73; H04L 45/00; H04L 12/4633; H04L 12/5695; H04L 45/16; H04W 88/14; H04W 76/02; H04W 88/12; H04W 92/02; H04W 88/181
USPC .............. 455/560, 518, 503, 466, 509, 414.1, 455/313, 502, 412.1, 3.01, 3.05, 458; 370/236, 237, 252, 312, 449, 468, 469
See application file for complete search history.

(56) References Cited

U.S. PATENT DOCUMENTS 4,974,256 A * 11/1990 Cyr et al. ................. 379/112.04
2004/0170156 A1* 9/2004 O'Neill ......................... 370/349
(Continued)

FOREIGN PATENT DOCUMENTS

CN 1567173 A 1/2005
CN 1913465 A 2/2007
(Continued)

OTHER PUBLICATIONS

Michael Neophytou, et al., "Hybrid CAC for MBMS-Enabled 3G UMTS Networks," The 17th Annual IEEE International Symposium on Personal, Indoor and Mobile Radio Communications, dated Sep. 1, 2003. (5 pages.).
(Continued)

*Primary Examiner* — Mahendra Patel
(74) *Attorney, Agent, or Firm* — McCormick, Paulding & Huber, LLP

(57) ABSTRACT

A method and system for selecting traffic processors for processing and transmitting broadcast/multicast service flow in a cellular network includes evaluating processor occupancy of a plurality of traffic processors and selecting the traffic processors with the highest available processor occupancy. The cellular network has one or more base stations that are connected to a radio network controller, the radio network controller having a plurality of traffic processors to process the radio signals and data traffic to be transmitted to the base stations. A required processor occupancy for transmitting the broadcast/multicast service flow to the base stations is estimated and the traffic processors are selected such that their combined available processor occupancy is greater than the required processor occupancy for the broadcast/multicast service flow. The method and system optimizes resource utilization and distribution among the plurality of traffic processors.

14 Claims, 3 Drawing Sheets

(56) References Cited

U.S. PATENT DOCUMENTS

| | | | |
|---|---|---|---|
| 2005/0288025 A1* | 12/2005 | Yoshida et al. | 455/442 |
| 2006/0221821 A1* | 10/2006 | Martinez Ransom et al. | 370/229 |
| 2007/0183323 A1* | 8/2007 | Hannu et al. | 370/230 |
| 2008/0232294 A1* | 9/2008 | Ulupinar et al. | 370/312 |
| 2008/0311924 A1* | 12/2008 | Lucidarme | 455/452.1 |

FOREIGN PATENT DOCUMENTS

| | | |
|---|---|---|
| JP | 2004208178 A | 7/2004 |
| JP | 2006270381 A | 10/2006 |
| JP | 2008227721 A | 9/2008 |

OTHER PUBLICATIONS

Tilman Wolf, et al., "Predictive Scheduling of Network Processors," Computer Networks: The International Journal of Computer and Telecommunications Networking, vol. 41, No. 5, dated Apr. 2003. (21 pages.).

Arun Viswanathan, et al., "Impact of CPU Reservation on End-to-End Media Data Transmission," IEEE International Performance, Computing and Communications Conference, dated Apr. 4, 2001. (8 pages.).

George Xylomenos, et al., "Wireless Multimedia in 3G Networks," Emerging Wireless Multimedia: Services and Technologies, dated Jan. 3, 2006. (25 pages.).

Mariann Hauge, et al., "Multicast in 3G Networks: Employment of Existing IP Multicast Protocols in UMTS," ACM International Workshop on Wireless Mobile Multimedia, dated Sep. 28, 2002. (8 pages.).

International Search Report and Written Opinion from corresponding internation appln. No. PCT/US2009/057101, dated May 7, 2010. (18 pages.).

Second Notice of Preliminary Rejection dated Dec. 24, 2012 issued by the Korean Patent Office.

Notification of the First Office Action dated Dec. 3, 2012 issued by the Chinese Patent Office.

Examiner's Office letter dated Jan. 16, 2013 issued by the Japanese Patent Office.

* cited by examiner

METHOD AND SYSTEM OF TRAFFIC PROCESSOR SELECTION FOR BROADCAST/MULTICAST SERVICE IN A WIRELESS NETWORK

FIELD OF THE INVENTION

The present invention relates to telecommunications and, more particularly, to traffic processor selection for wireless communications systems.

BACKGROUND OF THE INVENTION

FIG. 1 illustrates the topography of a typical cellular telecommunications network 10 (e.g., mobile phone network). The network 10 is geographically divided into a number of cells or sectors 12, which are typically contiguous and which together define the coverage area of the network 10. Each cell 12 is served by a base station 14, which includes one or more fixed/stationary transceivers and antennae 16 for wireless communications, over a reverse link 24 and a forward link 26, with a set of distributed mobile devices 18 (e.g., mobile phones, wireless PDA's, wireless devices with high-speed data transfer capabilities, "WiFi"-equipped computer terminals, and the like) that provide service to the network's users. The base stations 14 are in turn connected (either wirelessly or through land lines) to a radio network controller ("RNC") 20, which serves a particular number of base stations depending on network capacity and configuration. The RNC 20 acts as the interface between the wireless/radio end of the network 10 and a public switched telephone network, packet switched core network or other network(s) 22, including performing the signaling functions necessary to establish calls or other data transfer to and from the mobile devices 18.

The RNC 20 is the governing element in the radio access network and is responsible for control of the base stations 14 that are connected to the RNC 20. The RNC 20 includes traffic processors to carry out radio resource management and control the use and integrity of the radio resources within the wireless network. Thus, the RNC is able to process signaling traffic, terminate access, perform connection setup, process data traffic, as well as many other functions.

Various methods exist for conducting wireless communications between the base stations 14 and mobile devices 18. One such method is the CDMA (code division multiple access) spread-spectrum multiplexing scheme, widely implemented in the United States under the "IS-95," "IS-2000," or other standards. While early systems were primarily configured for voice communications, technological improvements have enabled the development of "3-G" (third generation) networks, such as CDMA-based 1x-EVDO wireless networks (1x-EVDO is an implementation of the CDMA2000® "3-G" mobile telecommunications protocol/specification configured for the high-speed wireless transmission of both voice and non-voice data.) and similar wireless networks for both voice and high-speed packet data communications.

One technological improvement enabled by "3-G" networks is broadcast/multicast service, which allows high-speed delivery of packet data to multiple access terminals, such as mobile devices 18. Thus, broadcast/multicast service provides the capability to reach an unlimited number of users simultaneously, allowing the broadcast of television, film, information and other media. To provide the capability to reach an unlimited number of users simultaneously, broadcast/multicast service requires a high priority quality of service (QoS) and a high reliability.

To provide service to the mobile devices 18, including broadcast/multicast service, the serving RNC selects traffic processor(s) for each flow to process and transmit the contents to the base stations 14. For example, in broadcast/multicast service, the broadcast/multicast flow may be broadcast by the traffic processor(s) to hundreds of base stations, simultaneously. The broadcast/multicast flow carries a burst of a large number of packets, wherein the burst size will vary widely depending upon various system parameters. Accordingly, the processor occupancy required at the traffic processor(s) to process and transmit the broadcast/multicast service flow will also vary widely depending upon the various system parameters, making it difficult to guarantee the required performance by provide a traffic processor (or traffic processors) with sufficient resources to support broadcast/multicast service.

SUMMARY OF THE INVENTION

An embodiment of the present invention relates to a method for selecting a traffic processor for transmitting broadcast/multicast service flow in a cellular network. The cellular network has one or more base stations that are connected to an RNC, which are in turn connected to one or more networks. The RNC includes a plurality of traffic processors to process the radio signals and data traffic to be transmitted to the base stations. The method according to the present invention optimizes resource utilization and distribution among the plurality of traffic processors. The method includes evaluating processor occupancy of the plurality of traffic processors, and selecting the traffic processor with the highest available processor occupancy.

Another embodiment of the present invention relates to predicting the processor occupancy required to transmit the broadcast/multicast service flow. In this embodiment, traffic processors are selected in order of decreasing available processor occupancy until the selected traffic processors have sufficient processor occupancy to transmit the broadcast/multicast service flow.

Another embodiment of the present invention relates to the selection of multiple traffic processors wherein additional traffic processors are selected by selecting the traffic processors with the highest available processor occupancy when the processor occupancy available on the first traffic processor is insufficient to support the broadcast/multicast flow.

Another embodiment of the present invention relates to a system for selecting traffic processors for transmitting broadcast/multicast service flow in a cellular network. The system includes a broadcast/multicast service optimizer that selects the traffic processors according to the required processor occupancy for the broadcast/multicast service flow and the resource utilization and distribution among the plurality of traffic processors.

BRIEF DESCRIPTION OF THE DRAWINGS

The present invention will be better understood from reading the following description of non-limiting embodiments, with reference to the attached drawings, wherein.

DETAILED DESCRIPTION

Figure 2:
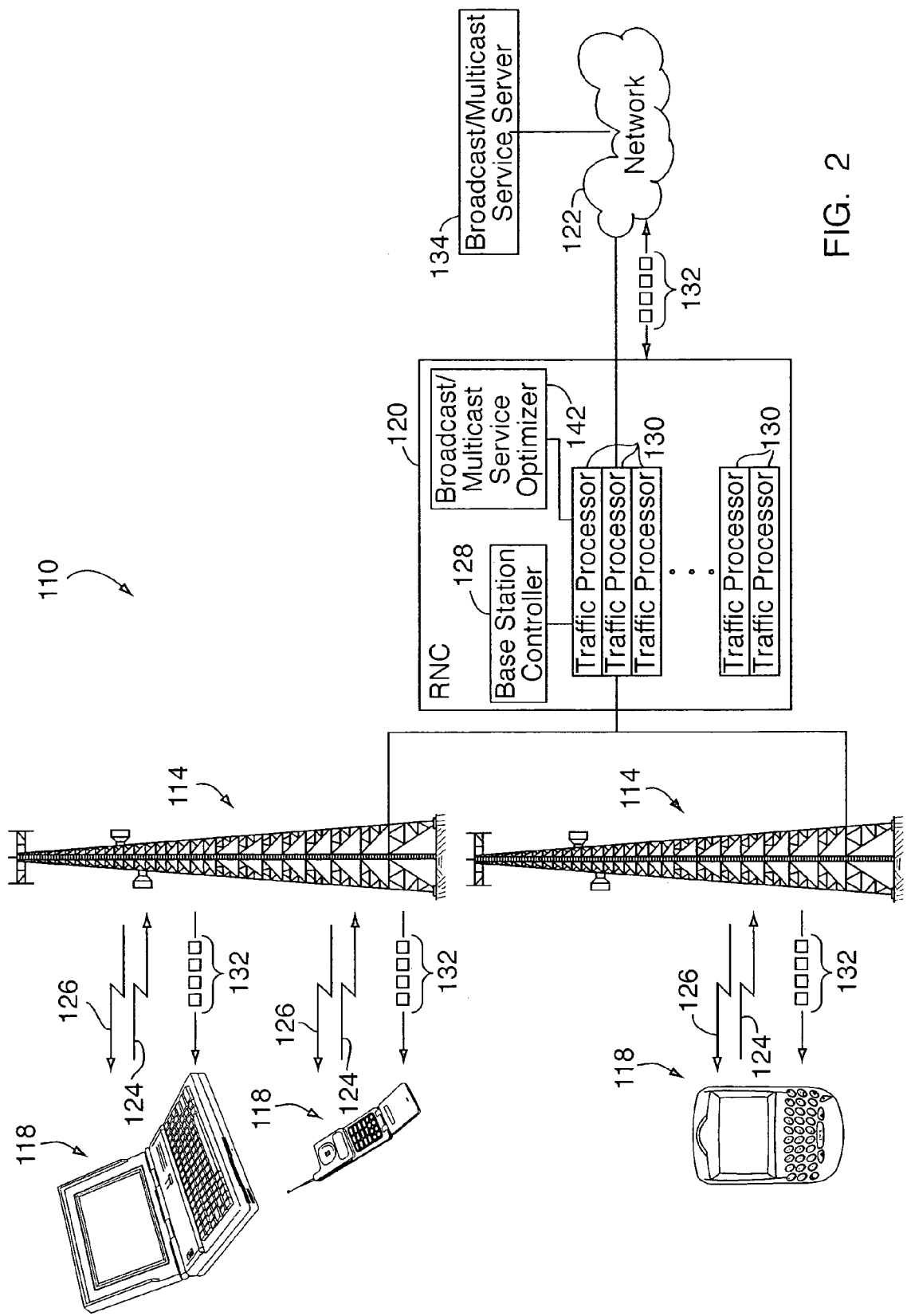
FIG. 2 is a schematic diagram of a cellular network according to an embodiment of the present invention.

Referring to FIG. 2, an embodiment of the present invention relates to a method and system of traffic processor selection for broadcast/multicast service in a wireless network to optimize resource utilization and distribution among the traffic processors. The cellular network 110 includes one or more base stations 114 that wirelessly communicate with a number of mobile devices 118 over a reverse link 124 (i.e., mobile device to base station link) and a forward link 126 (i.e., base station to mobile device link) according to a CDMA (code division multiple access) or other communications protocol.

The mobile devices 118 may include, for example, mobile phones, wireless PDA's, wireless devices with high-speed data transfer capabilities, such as those compliant with "3-G" or "4-G" standards, "WiFi"-equipped computer terminals, and the like.

As indicated in FIG. 2, the base stations 114 will typically be connected to a radio network controller ("RNC") 120, which will in turn be connected to one or more networks 122. Among other possible components, the RNC 120 includes a base station controller 128 that controls the connections between the base stations 114 and the mobile devices 118; for example by performing connection setup and access termination. The RNC 120 also includes a plurality of traffic processors 130 to process radio signals and data traffic.

The traffic processors 130 process data as required according to the communication protocols in place on the network (i.e. CDMA-based 1x-EVDO). In broadcast/multicast service, the traffic processor(s) 130 receives data flow, typically in the form of packet data 132, from a broadcast/multicast service server 134 connected to the network 122. The traffic processors 130 generate and duplicate the broadcast/multicast service radio link protocol ("RLP"), perform Reed-Solomon coding, and send the packet data 132 to the various base stations 114 for transmission to the mobile devices 118 over the forward link 126.

Since broadcast/multicast service enables the simultaneous broadcast of information to an unlimited number of users, it requires a high priority quality of service ("QoS") and a high reliability. To maintain the high priority QoS and high reliability, the traffic processors 130 supporting the broadcast/multicast service flow must not become overloaded, or data packets 132 may be dropped or damaged. In broadcast/multicast service, various system parameters, such as flow radio data rate, Reed-Solomon coding type and interlace-multiplex ("IM") pairs, control the flow throughput, Reed-Solomon coding scheme and the forward link time slots to be used for transmitting the flow and, therefore, these system parameters define the traffic processor loading necessary to transmit the broadcast/multicast flow. Accordingly, processor occupancy 36, shown in FIG. 3, required to process and transmit the broadcast/multicast service flow will vary depending upon these parameters.

Figure 3:
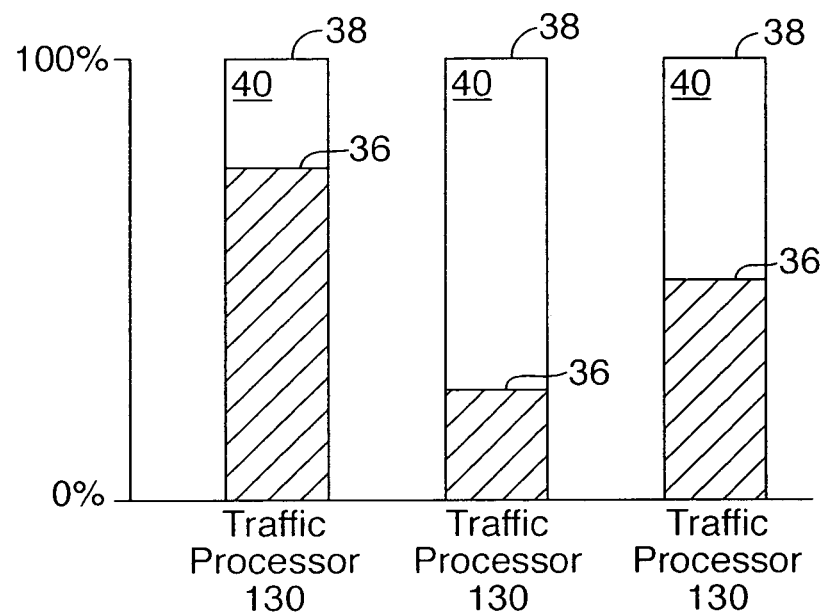
FIG. 3 is a graphical representation of traffic processor loading in the cellular network of FIG. 2.
Figure 4:
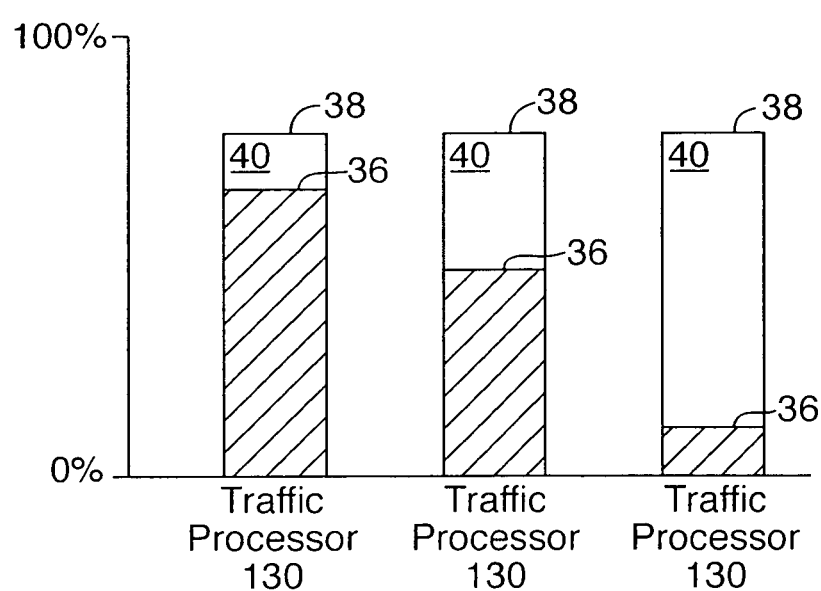
FIG. 4 is a graphical representation of an alternative embodiment of traffic processor loading in the cellular network of FIG. 2.

Referring to FIG. 3, processor occupancy 36 is a measure of processor loading on a traffic processor 130. For example, a processor occupancy 36 of 100% corresponds to a traffic processor 130 that is rated as fully loaded, whereas, a processor occupancy 36 of 0% corresponds to a traffic processor 130 that is unloaded. If the processor occupancy 36 of a traffic processor 130 exceeds a preset maximum allowable processor occupancy threshold 38, the traffic processor 130 will enter an overload stage, where packet data 132 will likely be dropped or damaged. Thus, processor occupancy 36 is an important parameter for maintaining the integrity of cellular telecommunications networks 110. A traffic processor's available processor occupancy 40, defined as the difference between the maximum allowable processor occupancy threshold 38 and the current processor occupancy 36, can be measured and monitored by the RNC 120 or an external device. Although the maximum allowable processor occupancy threshold is shown in FIG. 3 at 100%, it should be understood that the maximum allowable processor occupancy threshold 38 may be preset at any desired value. For example, as seen in FIG. 4, the maximum allowable processor occupancy threshold 38 is set at a processor occupancy of approximately 80%.

Referring back to FIG. 2, in addition to being dependent upon the various flow parameters, the processor occupancy 36 required to process and transmit the broadcast/multicast service flow also depends largely on the number of base stations 114 that are to be supported by the flow. When a broadcast/multicast service flow is to be transmitted from the broadcast/multicast service server 134 to a plurality of base stations 114, the broadcast/multicast flow must be processed at the RNC 120 (or RNCs) serving the plurality of base stations 114. Thus, an embodiment of the present invention includes a broadcast/multicast service optimizer 142 to select one or more traffic processors 130 with the necessary available processor occupancy 40 to process and transmit the broadcast/multicast service flow to ensure integrity of the transmission. The broadcast/multicast service optimizer 142 may be implemented as a hardware module, hardware/software module, or software module (e.g., script or other software program, or suite of software programs), in a standalone manner, communicating with the RNC 120 or, alternatively, the method may be integrated directly with the RNC 120, for carrying out the method described herein.

Figure 1:
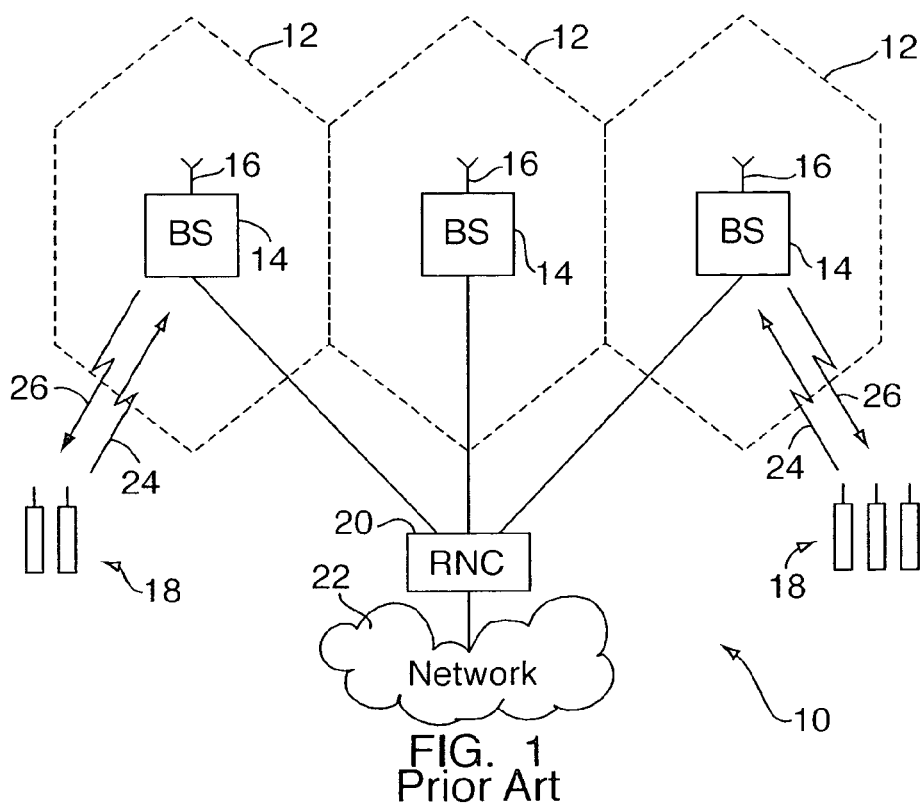
FIG. 1 is a schematic diagram of a cellular telecommunications network according to the prior art.
Figure 5:
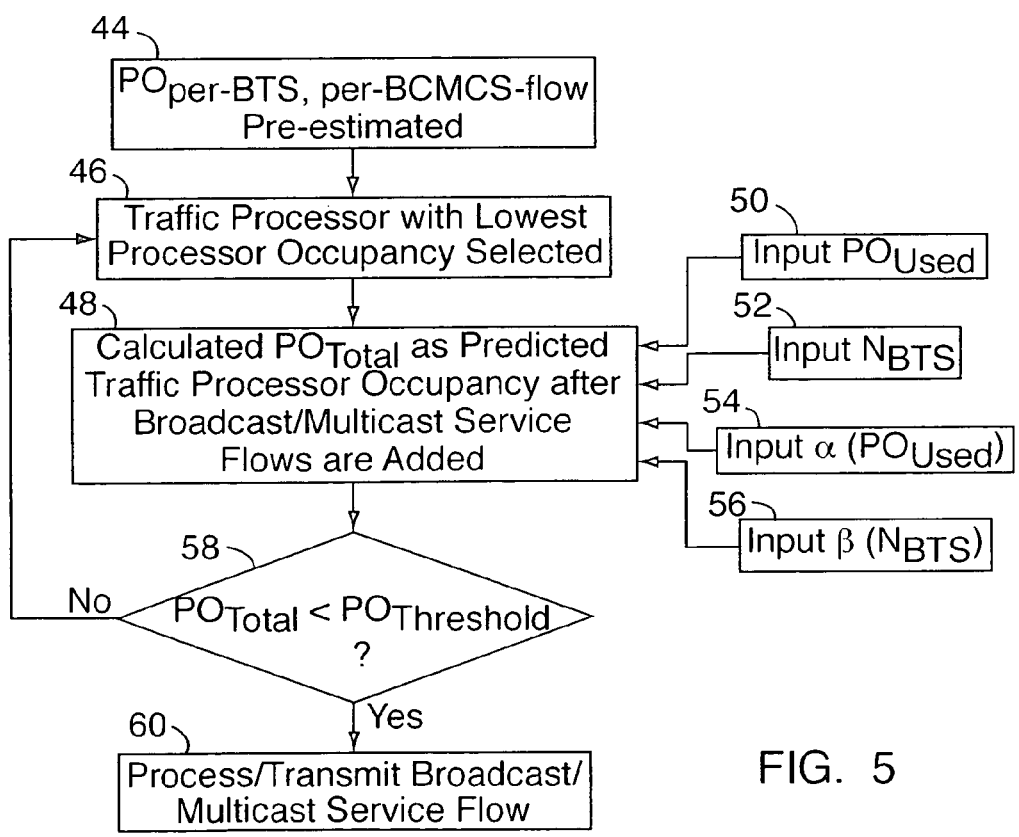
FIG. 5 is a flowchart illustrating a method of traffic processor selection for broadcast/multicast service in the cellular network of FIG. 2.

Referring to FIG. 5, a method for selecting one or more traffic processors 130 to process and generate broadcast/multicast service flow according to an embodiment of the present invention is shown. The method includes selecting the traffic processor(s) 130 based upon a prediction of the processor occupancy 36 required for the broadcast/multicast service flow at the stage of flow request.

In step 44, $PO_{per\text{-}BTS,per\text{-}BCMCS\text{-}flow}$, the required processor occupancy 36 to support a new broadcast/multicast service flow for a single base station 114 is estimated. The required processor occupancy 36 is evaluated from the flow radio parameters, such as radio data rate, Reed-Solomon coding and IM pairs assigned. For example, a traffic processor occupancy table may be obtained through lab testing, with processor occupancy 36 being measured in the linear processor occupancy range, such as $$\frac{1}{2} \times PO_{threshold},$$

where $PO_{threshold}$ is the maximum allowable processor occupancy threshold 38, above which the traffic processor 130 becomes overloaded. Although processor occupancy 36 may be measured in the linear processor occupancy range to develop a traffic processor occupancy table, the relationship between power occupancy 36 and power occupancy loading is not entirely linear. Thus, in order to better estimate the required process occupancy, coefficients may be established to account for non-linear change in power occupancy 36 as a function of the power occupancy loading, as discussed below. Thus, by inputting the broadcast/multicast service flow parameters in the processor occupancy table, a prediction of the required processor occupancy to support the new broadcast/multicast service flow for a single base station 114 can be established.

As stated above, the total processor occupancy 36 required to transmit and process the broadcast/multicast service flow will increase as $N_{total\_BTS}$, the total number of base stations 114 that are to support the broadcast/multicast service flow, increases. Thus, the number of traffic processors 130 required to provide the necessary available processor occupancy 36 for processing the broadcast/multicast service flow will also vary depending upon $N_{total\_BTS}$.

In step 46, the traffic processor 130 with the lowest measured processor occupancy 36 (i.e. the highest available processor occupancy) among all available traffic processors 130 at the serving RNC 120 is selected for processing the broadcast/multicast service flow. Processor occupancy 36 may be measured and monitored by the RNC 120 or, alternatively, by an external measuring device. In step 48, the predicted traffic processor occupancy 36 after the new broadcast/multicast service flow is added to the selected traffic processor is calculated using the equation:

$$PO_{total} = PO_{used} + \alpha(PO_{used}) \times PO_{per\text{-}BTS,per\text{-}BCMCS\text{-}flow} \times \beta(N_{BTS}) \times N_{BTS}$$

Where:

$PO_{total}$ is the predicted traffic processor occupancy after the new broadcast/multicast flow is added;

$PO_{used}$ is the traffic processor occupancy measured before the new broadcast/multicast flow is added;

$N_{BTS}$ is the number of base stations 114 that the traffic processor 130 needs to support for the broadcast/multicast service flow;

$PO_{per\text{-}BTS,per\text{-}BCMCS\text{-}flow}$ is the estimate of the required processor occupancy 36 to support the new broadcast/multicast service flow for a single base station 114;

$\alpha(PO_{used})$ is the non-linear coefficient, as a function of $PO_{used}$, to compensate for the processor occupancy non-linearity when the processor occupancy loading is heavy; and $\beta(N_{BTS})$ is the non-linear coefficient to compensate for the processor occupancy nonlinearity with respect to the number of base stations 114 to broadcast, and is therefore a function of $N_{BTS}$.

To perform the calculation in step 48, $PO_{used}$ at the selected traffic processor is input in step 50. Additionally, the total number of base stations 114 that the traffic processor 130 needs to support for the broadcast/multicast service flow is input as $N_{BTS}$ in step 52, and the non-linear coefficients $\alpha(PO_{used})$ and $\beta(N_{BTS})$ are input in steps 54 and 56, respectively. Using these inputs, the calculation is performed in step 48 to determine if the selected traffic processor 130 has sufficient available processor occupancy 40 to support the total number of base stations 114 needed for the new broadcast/multicast service flow.

As should be understood by those skilled in the art, the coefficient $\alpha(PO_{used})$ can be obtained through lab testing by varying $PO_{used}$ to determine the non-linear change in power occupancy 36 as a function of the power occupancy loading. Similarly, the coefficient $\beta(N_{BTS})$ can also be obtained through lab testing by varying $N_{BTS}$ to determine the non-linear change in power occupancy 36 as a function of the number of base stations 114 being supported.

By setting the constraint that $PO_{total} < PO_{threshold}$, the above equation is used to evaluate the maximum number of base stations 114 that the traffic processor 130 can support for the broadcast/multicast service flow. This constraint ensures that the traffic processor 130 will not be overloaded by the broadcast/multicast service flow, which would result in dropped or damaged data packets 132. Thus, in step 58, it is determined whether $PO_{total} < PO_{threshold}$ at the selected traffic processor 130.

Step 58 allows the number of base stations 114 that the traffic processor 130 can support without exceeding $PO_{threshold}$ to be compared to the total number of base stations 114 needed to support the broadcast/multicast service flow. If $N_{BTS}$, the number of base stations that the traffic processor 130 can support without exceeding $PO_{threshold}$, is greater than $N_{total\_BTS}$, the total number of base stations 114 needed for the broadcast/multicast service, the broadcast/multicast service flow is processed and transmitted in step 60. However, if $PO_{total}$ is greater than $PO_{threshold}$, i.e. the number of base stations that the traffic processor 130 can support without exceeding $PO_{threshold}$ is less than the total number of base stations 114 needed for the broadcast/multicast service flow, steps 46 through 58 are repeated to select additional traffic processors 130 to support the broadcast/multicast service flow. Thus, the method according to the present invention is able to guarantee network resources and, therefore, guarantee broadcast/multicast service flow quality requirements, which is a critical performance issue associated with broadcast/multicast service flow.

When implemented in a wireless network, as seen in FIG. 2, this method guarantees the broadcast/multicast service flow performance by ensuring that there is no performance degradation due to insufficient processor processing power. By first predicting the power occupancy resources required to support the broadcast/multicast service flow, resources may be reserved for use with that particular broadcast/multicast service flow.

Additionally, the method ensures that the broadcast/multicast service flow uses the least loaded traffic processors 130, thereby allowing the broadcast/multicast service flow to be supported by the minimum possible number of total traffic processors 130. This increases reliability by concentrating the broadcast/multicast service flow to fewer lines, rather than being distributed to a relatively large number of links.

Furthermore, the method according to the present invention provides for a highly efficient process for traffic processor selection. By selecting the traffic processor 130 with the lowest processor occupancy 36 in step 46 at each pass through the loop in FIG. 5, the method maximizes its efficiency by ensuring that the fewest number of loops through the process are required for each broadcast/multicast service flow. Additionally, the use table look-ups for non-linear coefficients $\alpha(PO_{used})$ and $\beta(N_{BTS})$, as well as for pre-estimated $PO_{per\text{-}BTS,per\text{-}BCMCS\text{-}flow}$ provide for a simplified process that requires minimal processing power and time to execute.

Since certain changes may be made in the above-described method and system for traffic processor selection for broadcast/multicast service in a wireless network to optimize resource utilization and distribution among the traffic processors, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for selecting a traffic processor for transmitting broadcast/multicast service flow in a cellular network, said method comprising the steps of:
   predicting a processor occupancy required to transmit the broadcast/multicast service flow;
   evaluating processor occupancy of a plurality of traffic processors;
   selecting the traffic processor with the highest available processor occupancy; and
   comparing an available processor occupancy at the selected traffic processor to the predicted processor occupancy required to transmit the broadcast/multicast service flow, wherein the step of comparing the available processor occupancy at the selected traffic processor to the predicted processor occupancy required to transmit the broadcast/multicast service flow includes calculating a maximum number of base stations that the selected traffic processors can support for the broadcast/multicast service flow.

2. The method according to claim 1, wherein the maximum number of base stations is calculated by the equation $$PO_{total} = PO_{used} + \alpha(PO_{used}) \times PO_{per\text{-}BTS,per\text{-}BCMCS\text{-}flow} \times \beta(N_{BTS}) \times N_{BTS}$$

wherein
$PO_{total}$ is the predicted traffic processor occupancy after the broadcast/multicast flow is added;
$PO_{used}$ is the traffic processor occupancy measured before the broadcast/multicast flow is added;
$N_{BTS}$ is the number of base stations that the traffic processor can support for the broadcast/multicast service flow;
$PO_{per\text{-}BTS,per\text{-}BCMCS\text{-}flow}$ is the estimate of the required processor occupancy to support the broadcast/multicast service flow for a single base station;
$\alpha(PO_{used})$ is the non-linear coefficient, as a function of $PO_{used}$, to compensate for the processor occupancy non-linearity when the processor occupancy loading is heavy; and
$\beta(N_{BTS})$ is the non-linear coefficient, as a function of $N_{BTS}$, to compensate for the processor occupancy nonlinearity with respect to the number of base stations to broadcast.

3. The method according to claim 1, additionally comprising the step of selecting additional traffic processors in order of decreasing available processor occupancy when the available processor occupancy of the first traffic processor is insufficient to support the broadcast/multicast flow until the selected traffic processors have sufficient processor occupancy to transmit the broadcast/multicast service flow.

4. A method for selecting a traffic processor for transmitting broadcast/multicast service flow in a cellular network, said method comprising the steps of:
   predicting a processor occupancy required to transmit the broadcast/multicast service flow;
   evaluating processor occupancy of a plurality of traffic processors;
   selecting the traffic processor with the highest available processor occupancy;
   comparing an available processor occupancy at the selected traffic processor to the predicted processor occupancy required to transmit the broadcast/multicast service flow; and
   selecting additional traffic processors in order of decreasing available processor occupancy when the available processor occupancy of the first traffic processor is insufficient to support the broadcast/multicast flow until the selected traffic processors have sufficient processor occupancy to transmit the broadcast/multicast service flow,
   wherein the step of selecting additional traffic processors in order of decreasing available processor occupancy until the selected traffic processors have sufficient processor occupancy to transmit the broadcast/multicast service flow includes calculating a maximum number of base stations that the selected traffic processors can support for the broadcast/multicast service flow.

5. The method according to claim 4, wherein the maximum number of base stations is calculated by the equation $$PO_{total} = PO_{used} + \alpha(PO_{used}) \times PO_{per\text{-}BTS,per\text{-}BCMCS\text{-}flow} \times \beta(N_{BTS}) \times N_{BTS}$$

wherein
$PO_{total}$ is the predicted traffic processor occupancy after the broadcast/multicast flow is added;
$PO_{used}$ is the traffic processor occupancy measured before the broadcast/multicast flow is added;
$N_{BTS}$ is the number of base stations that the traffic processor can support for the broadcast/multicast service flow;
$PO_{per\text{-}BTS,per\text{-}BCMCS\text{-}flow}$ is the estimate of the required processor occupancy to support the broadcast/multicast service flow for a single base station;
$\alpha(PO_{used})$ is the non-linear coefficient, as a function of $PO_{used}$, to compensate for the processor occupancy non-linearity when the processor occupancy loading is heavy; and
$\beta(N_{BTS})$ is the non-linear coefficient, as a function of $N_{BTS}$, to compensate for the processor occupancy nonlinearity with respect to the number of base stations to broadcast.

6. The method according to claim 3, wherein the total available processor occupancy of the selected traffic processors is equal to the processor occupancy required for the broadcast/multicast service flow.

7. The method according to claim 3, wherein the total available processor occupancy of the selected traffic processors is greater than the processor occupancy required for the broadcast/multicast service flow.

8. The method according to claim 1, wherein the step of predicting the processor occupancy required to transmit the broadcast/multicast service flow includes evaluating one or more flow radio parameters.

9. The method according to claim 8, wherein the one or more radio parameters are selected from a group consisting of radio data rate, Reed-Solomon coding and IM pairs assigned.

10. The method according to claim 1, wherein additional traffic processors are selected by evaluating the processor occupancy of the unselected traffic processors of the plurality of traffic processors and selecting the traffic processor with the highest available processor occupancy when the available processor occupancy of the selected traffic processors is insufficient to support the broadcast/multicast flow.

11. A cellular network comprising:
    processor occupancy estimation means for estimating a required processor occupancy for a broadcast/multicast service flow; and
    processor occupancy evaluation means for evaluating a processor occupancy of a plurality of traffic processors;
    wherein the cellular network selects traffic processors in order of decreasing available processor occupancy until the selected traffic processors have greater evaluated processor occupancy than the estimated required processor occupancy for the broadcast/multicast service flow; and wherein the processor occupancy evaluation means includes a calculation of a maximum number of base stations that the selected traffic processors can support for broadcast/multicast service flow using the equation $$PO_{total} = PO_{used} + \alpha(PO_{used}) \times PO_{per\text{-}BTS,per\text{-}BCMCS\text{-}flow} \times \beta(N_{BTS}) \times N_{BTS};$$

wherein $PO_{total}$ is the predicted traffic processor occupancy after the broadcast/multicast flow is added;

$PO_{used}$ is the traffic processor occupancy measured before the broadcast/multicast flow is added;

$N_{BTS}$ is the number of base stations that the traffic processor can support for the broadcast/multicast service flow;

$PO_{per\text{-}BTS,per\text{-}BCMCS\text{-}flow}$ is the estimate of the required processor occupancy to support the broadcast/multicast service flow for a single base station;

$\alpha(PO_{used})$ is the non-linear coefficient, as a function of $PO_{used}$, to compensate for the processor occupancy non-linearity when the processor occupancy loading is heavy; and $\beta(N_{BTS})$ is the non-linear coefficient, as a function of $N_{BTS}$, to compensate for the processor occupancy nonlinearity with respect to the number of base stations to broadcast.

12. The cellular network according to claim 11, wherein the processor occupancy estimation means includes a traffic processor occupancy table.

13. The cellular network according to claim 11, wherein the processor occupancy evaluation means includes an estimate of required processor occupancy to support a broadcast/multicast service flow for a single base station.

14. The cellular network according to claim 11, wherein the processor occupancy evaluation means includes a measure of processor occupancy before a broadcast/multicast flow is added to the plurality of traffic processors.

* * * * *